United States Patent [19]

Noah

[11] 3,929,313

[45] Dec. 30, 1975

[54] ANTI-BOTTOMING FLUID CONTROL SYSTEM

[75] Inventor: Russell V. Noah, Covina, Calif.

[73] Assignee: Greer Hydraulics, Inc., Los Angeles, Calif.

[22] Filed: July 31, 1974

[21] Appl. No.: 493,258

[52] U.S. Cl. ............... 251/28; 137/599.2; 137/522
[51] Int. Cl.² .......................................... F16K 31/12
[58] Field of Search .......... 251/28, 62, 63.5, 82, 83; 137/522, 523, 599.2; 91/420, 445

[56] References Cited
UNITED STATES PATENTS

| | | | |
|---|---|---|---|
| 2,653,626 | 9/1953 | Finlayson | 137/599.2 |
| 3,623,509 | 11/1971 | Sesseler | 137/522 X |

FOREIGN PATENTS OR APPLICATIONS

| | | | |
|---|---|---|---|
| 1,293,034 | 4/1969 | Germany | 137/599.2 |

Primary Examiner—Henry T. Klinksiek
Attorney, Agent, or Firm—Arthur B. Colvin

[57] ABSTRACT

The present invention relates to an anti-bottoming control system for controlling the flow of fluid in a passage. The invention is intended to provide a means for controlling the open or closed position of a valve in a fluid flow system, and particularly a high pressure fluid flow system, the characterizing feature of the invention being the elimination of bottoming or slamming of the valve against the valve seat in the final closing stages of the valve.

5 Claims, 2 Drawing Figures

ANTI-BOTTOMING FLUID CONTROL SYSTEM

BACKGROUND OF THE INVENTION

1. Field of the Invention

The present invention is in the field of flow control systems. More particularly, it is directed to an actuator system for shifting the valve in a fluid passage or conduit between open and shut positions, the actuator system having anti-slam or anti-bottoming characteristics.

2. The Prior Art

It is known to provide fluid conduit systems, such as steam pipes or the like, with remotely actuated valves. Typically, in such systems a valve seat is disposed in the flow path in the main conduit and the valve body is, through the operation of the actuator mechanism, advanced into contact with the seat to interrupt flow. A problem in systems of the type described, especially in high pressure systems, such as steam pipes, arises in connection with the final closing movements of the valve.

In such final stages of seating of the valve, the forces of the fluid in the system act in combination with the forces of the actuator mechanism rapidly to accelerate the valve into contact with the valve seat. It will be readily recognized that the substantial impact of the rapidly seating valve will transmit a substantial vibration or shock throughout the conduit system and in extreme cases may induce a rupture of elements of the system. After repetitive cycles of operation, it is not unknown for the valve components to become deformed and/or crack and break, necessitating their replacement.

SUMMARY

The present invention may be summarized as directed to a system for controlling fluid flow in a conduit of the type in which a valve seat is disposed in the conduit and a valve mounted on a valve stem is shiftable toward and away from the seat, the system including a hydraulic actuator in the form of a double acting hydraulic cylinder, the piston rod of which is operatively connected to the valve.

Hydraulic fluid may be admitted to one chamber of the cylinder in such manner as to urge the piston, and hence the valve stem and valve, toward the seated position. During such closing movements of the valve, fluid at the opposite side of the piston head is passed to a reservoir through a pressure sensing pilot operated check and restrictor valve.

The orifice size of the restrictor valve, which is interposed in the bleed line of the hydraulic actuator, varies in size inversely with pressures sensed in the bleed line in excess of a predetermined pressure.

In the final closing stages of the valve, the forces of the fluid being controlled, act in a cumulative manner with the forces of the actuator or cylinder resulting in an increase in the pressure within the lower chamber of the hydraulic actuator cylinder and, hence, in the bleed conduit. Such increased pressures are sensed by the restrictor valve which reduces the orifice size by an amount which is a function of the pressure in the bleed line, whereby the final closing or bottoming of the valve against the valve seat is effected in a gradual manner.

Accordingly, it is an object of the invention to provide a hydraulic control system for controlling the closing movements of a valve interposed in a conduit, such as a steam pipe, whereby the final closing movements of the valve are effected in a gradual manner.

A further object of the invention is the provision of a hydraulic control system of the type described having anti-slam or anti-bottom characteristics.

Still a further object of the invention is the provision of a hydraulic control system including a double acting hydraulic cylinder, the piston of which is operatively connected to the valve stem, the hydraulic fluid being bled during closing of the valve assembly being passed through a restrictor valve which is pressure sensing, the restriction provided by the valve increasing in accordance with the pressure of the bleed fluid.

A further object of the invention is the provision of a check and restrictor valve of the type described.

Still a further object of the invention is the provision of a check and restrictor valve having means for regulating the size of the orifice during the major portion of the closing of the main valve, whereby the rate at which such closing is effected may be adjusted.

In the accompanying drawings, in which are shown one or more of the various possible embodiments of the several features of the invention;

Figure 1:
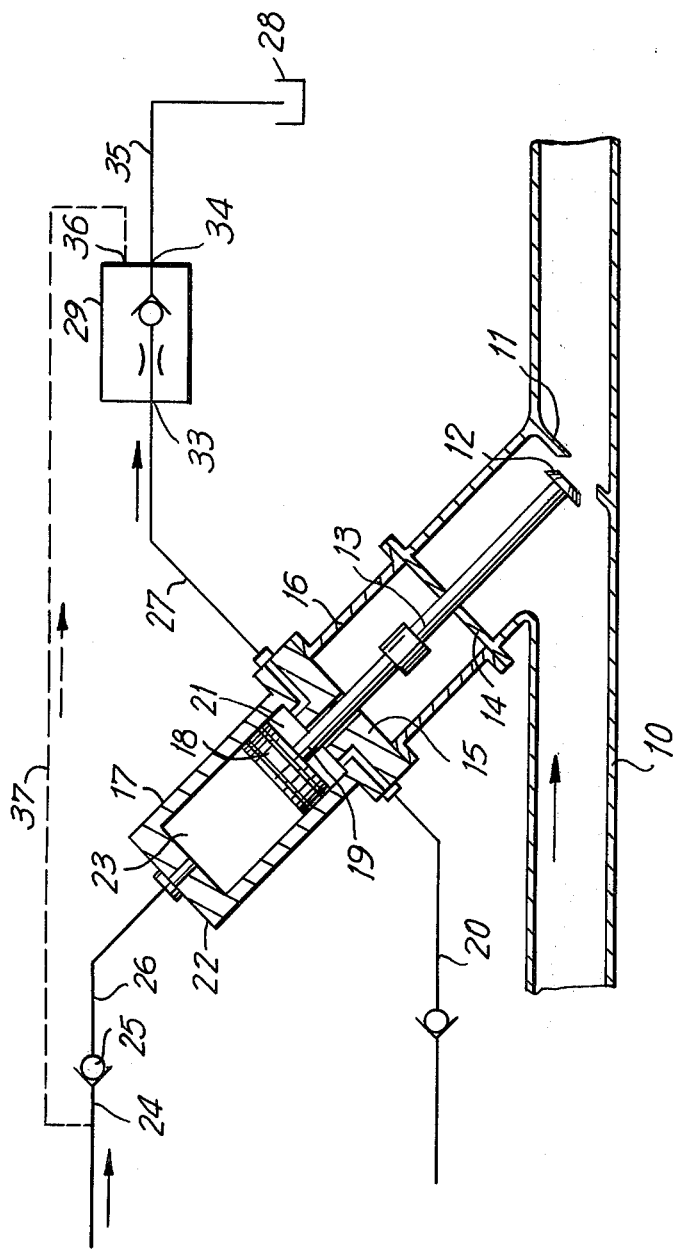
FIG. 1 is a schematic view of a system in accordance with the invention.

Referring now to FIG. 1, there is shown a pipe or conduit 10 which, by way of example, may be a pipe carrying steam at high pressures, i.e. 1,000 psi or more. The pipe 10 is provided with a valve seat 11. A valve member 12 is secured at the distal end of valve stem 13, the same being slidably guided and forming a sealed juncture with guide rings 14 and 15 in the valve housing 16.

A double acting hydraulic valve actuator cylinder 17 is mounted to the upper ring 15. A piston member 18 is reciprocably mounted within the cylinder 17, the piston head 18 being fixed to piston rod 19 secured to the valve stem 13.

An inlet line or conduit 20 is connected to the lower chamber 21 defined by the piston head 18 and cylinder 17.

When hydraulic fluid is admitted into the chamber 21 through line 20, the piston 18 will be shifted toward the upper end 22 of the cylinder 17, removing the valve 12 from the seat 11 and opening the conduit. Vent means (not shown) operated by the control assembly are provided for fluids expressed from the chamber 23 defined between the upper end 22 of the cylinder 17 and the piston 18.

In order to close the valve, hydraulic fluid under pressure is introduced into line 24 which, through check valve 25 and conduit 26, is connected with the chamber 23 of the double acting hydraulic cylinder assembly 17.

It will be appreciated that if the bleed line 27 were connected directly to a reservoir, as is the case in conventional valve actuators, the piston 18 would be moved toward the lower end or ring 15, advancing the valve 12 toward the valve seat 11 at a more or less constant rate. However, as the valve 12 closely approaches the seat 11, the forces of the fluid flowing in conduit 10, coupled with the hydraulic forces acting against piston 18, would rapidly accelerate the valve 12 into contact with seat 11, causing a highly undesirable slamming or bottoming. The sudden interruption of flow of the fluid resulting from such bottoming creates a shock in the system, possibly resulting in the rupture of a joint.

Additionally, the rapid pounding into closed position of the valve against the valve seat greatly accelerates wear on the noted parts.

Figure 2:
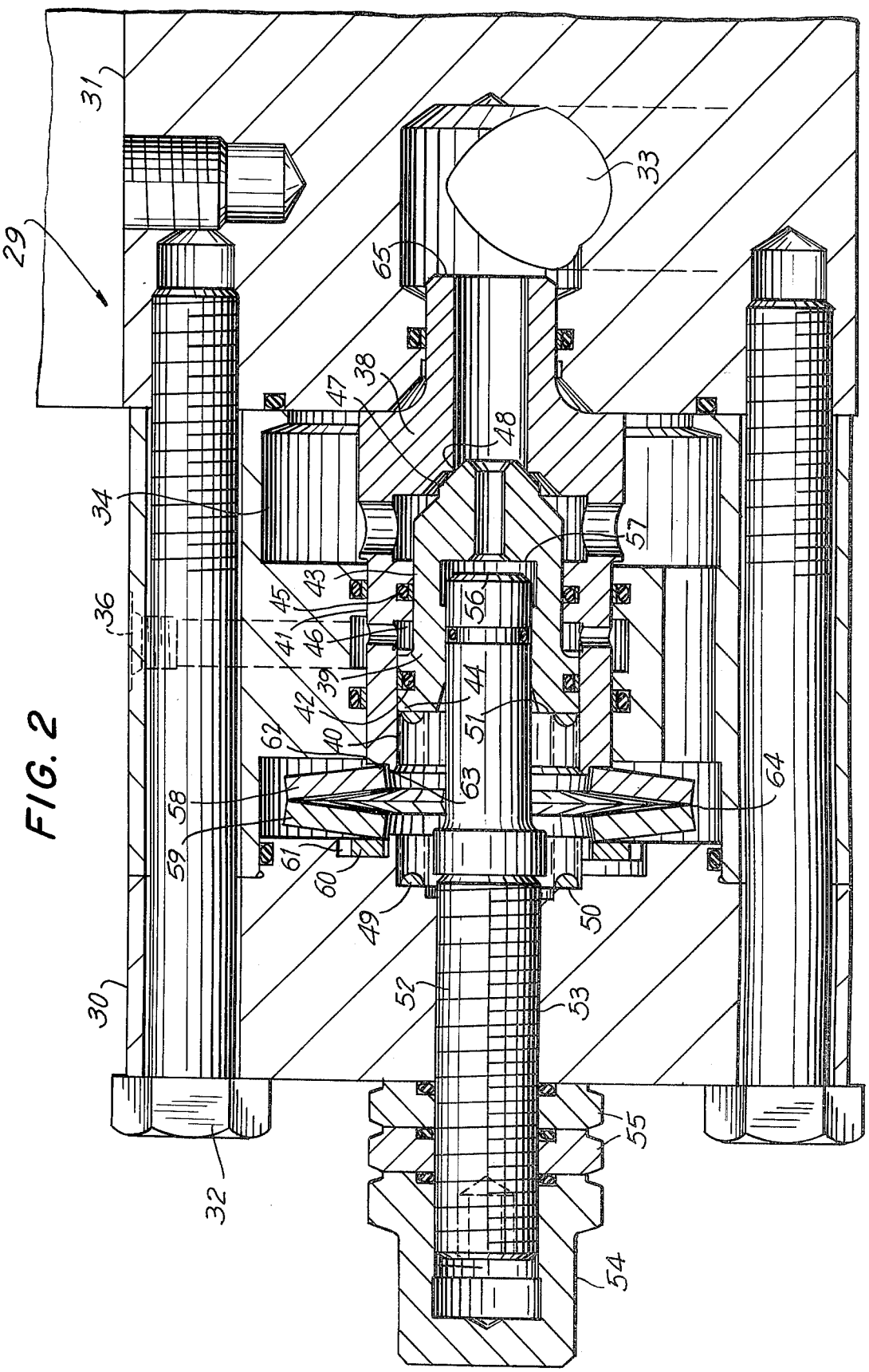
FIG. 2 is a magnified sectional view showing constructional details of the restrictor control valve.

In order to eliminate the bottoming or slamming effects above referred to, the bleed fluids in line 27 are fed to the reservoir 28 through the medium of a restrictor control valve 29, shown in detail in FIG. 2. It is the function of the valve 29 to provide a variable limited size orifice for fluids in line 27 whereby the speed of movement of the cylinder head 18 and, hence, the closing speed of the valve, may be controlled.

It is the further function of the valve member 29 to reduce the size of the orifice when pressures in the bleed line 27 exceed a predetermined value, the size of the restrictive orifice being reduced progressively as the pressure increases above said predetermined value.

Referring now to FIG. 2, the pilot operated check and restrictor valve 29 includes a valve casing 30 and top or block 31, the casing and block being held together by a series of connector bolts 32. The block portion 31 includes an inlet port 33 which is connected to bleed line 27 of the hydraulic cylinder assembly 17.

An outlet area 34 in the valve is, via an appropriate conduit in the valve, connected through line 35 to the reservoir 28. A pilot or control inlet 36 is connected to a controlled source of pilot pressure (see line 37, FIG. 1).

The valve 29 includes a movable seat member 38 and a movable poppet 39. The poppet 39 is slidable within internal bore 40 formed in a skirt or extension 41 of the valve seat assembly 38.

The poppet includes an O-ring 42 in sliding sealed connection to the bore 40, and a rearwardly directed sleeve 43 which is of lesser diameter than the portion 44 carrying the O-ring 42.

The sleeve 43 slides within a sealing O-ring 45 carried internally within the valve seat assembly 38. Pilot pressure may be communicated via inlet 36 to the region 46 between the seals 42 and 45.

The poppet 39 includes a tapered sealing portion 47 which is normally pressed into contact with the valve seat portion 48 of the seat assembly 38 by a helical spring member 49 biased between shoulder 50 on the casing and annular end portion 51 of the poppet.

Fluid flow from the input conduit 27 to the output area 34 leading to the reservoir via line 35 is normally blocked by the contact of the tapered portion 47 of the poppet 39 with the seat 48. When fluid is admitted into the pilot conduit 36, the poppet 39 is shifted leftwardly, in the orientation of FIG. 2, by reason of the greater diameter of the portion 44 of the poppet than the skirt portion 43. The amount of leftward movement of the poppet is controlled by adjustment stem 52 which is threaded at 53 into the body of the casing, suitable O-rings being interposed between the parts to prevent leakage. Axial adjustment of the stem 52 may be effected by rotation of the acorn nut 54, the parts being locked in the desired position by jam nuts 55. The end portion 56 of the stem 52 is disposed in the path of internal shoulder 57 of the poppet.

The spacing of the taper 47 of poppet 39 from the seat 48 and, accordingly, the size of the restricted orifice defined between the noted parts, will depend upon the adjusted position of the stem 52. The adjustment of the stem thus controls the "normal" closing speed, e.g., the speed with which fluid in the chamber 21 of the actuator assembly is permitted to flow through line 27 to reservoir 28 during normal pressure conditions within the said chamber 21 of actuator cylinder 17.

The valve seat assembly 38 is movable from its righthandmost position, illustrated in FIG. 2, in a leftwise direction, responsive to pressure buildup of a predetermined magnitude within the inlet area 33.

The seat assembly 38 is normally biased to the illustrated rightward position (FIG. 2) by a pair of Belleville spring members 58, 59. The left hand side of the spring 59 is abutted against an annular shim 60 disposed within a recess 61 formed in the casing. The center portion 62 of the spring 58 is mounted on a receiver seat 63 formed at the leftmost end of the valve seat assembly 38. The springs 58, 59 contact each other at their crown portions 64, the springs, being normally in a compressed condition, to exert a desired rightward biasing force on the seat assembly 38.

When the pressure in the area 33 exceeds a predetermined desired magnitude, the valve seat assembly 38, by reason of the forces exerted on the end portion 65 of the seat assembly, will be moved in a leftward direction against the biasing pressure of the springs 58, 59.

The operation of the assembly will be apparent from the preceding description.

When it is desired to close the valve in the main conduit 10, fluid is admitted through line 26, into actuator cylinder 17, causing the piston 18, its associated piston rod 19 and valve stem 13 to move the valve 12 toward the seat 11. At the same time as fluid is admitted to chamber 23 of the actuator piston, pilot pressure in the line 37 enters the control valve 29 through conduit 36 and reacts within the region 46 to shift the poppet 39 to the left, providing a restricted orifice between the seat 48 and taper valve portion 47 of the poppet. Fluid is thus permitted to flow from the in conduit 33 connected to the bleed line 27 of the actuator piston to the out region 34 connected to the reservoir. The valve 12 will thus close at a more or less constant rate since, during the major portion of its travel, its speed of movement is a function essentially of the speed with which hydraulic fluid is admitted to the chamber 23 of the actuator piston, which speed is, in turn, governed by the bleed rate of fluid through the control valve 29. During the major portion of its travel toward valve seat 11, the forces exerted by fluids within conduit 10 on valve 12 are essentially constant. The bleed rate is adjusted by adjusting the position of the stem 52 of the valve 29 governing the amount of unseating of the poppet from the valve seat 48.

In the final stages of the closing of the valve, as a result inter alia of Bernoulli effects, the fluid flowing in the conduit 10 provides an additive force tending to bottom or slam the valve 12 onto the seat 11. Such additional forces are reflected by an increase in pressure in the chamber 21 and bleed conduit 27. The increased pressure is transmitted to the "in" conduit 33 of the control valve 29, causing the valve seat assembly 38 to shift in a leftward direction against the pressure or the springs 58, 59, bringing the seat portion 48 close to the taper 47 of the leftwardly moved poppet 39 and constricting the orifice defined between the noted parts. The amount of constriction will be a function of the pressure in the area 33 since the greater the pressure, the greater the leftward movement of the valve seat assembly 38 against the bias of springs 58, 59.

As a result of the reduced orifice size, the bleed fluid from the chamber 21 will be slowed in its movement to the reservoir and, thus, the speed of movement of the valve 12 toward seat 11 will be likewise reduced, preventing the slamming or bottoming action in the final stages of closing of the valve.

Numerous modifications may suggest themselves to the skilled worker in the art, in the light of the teachings herein contained. Accordingly, the invention is to be broadly construed within the scope of the appended claims.

Having thus described my invention, what I claim as new and desire to secure by Letters Patent of the United States is:

1. An anti-bottoming fluid control system comprising a fluid supply passage having a valve seat, a valve member movable toward and away from said seat between sealing and opening positions of said passage, actuator means for moving said valve member between said positions including a hydraulic cylinder, a piston mounted in said cylinder and dividing the same into two chambers, said piston being operatively connected to said valve, first conduit means leading to one said chamber for introducing fluid into said chamber to shift said piston toward the sealing position of said valve, bleed conduit means leading to the other said chamber for conducting fluid expelled from said other chamber to a reservoir responsive to said movement of said piston toward said sealing position, and pressure sensing variable orifice restrictor valve means interposed between said bleed conduit and said reservoir for sensing the pressure in said bleed conduit and varying the flow resistance in the path between said conduit and reservoir directly in accordance with the pressure sensed in said bleed conduit.

2. The system in accordance with claim 1 wherein said restrictor valve means includes a control chamber, a valve seat member movably mounted in and forming a wall of said control chamber, spring means biasing said seat to a first limiting position in said control chamber, a poppet normally disposed in sealing position of said seat, control circuit means for moving said poppet a predetermined distance away from said seat to define a restricted orifice between said poppet and seat, and conduit means connecting said control chamber with said bleed conduit whereby said seat is caused to move within said chamber toward said poppet against the biasing force of said spring means responsive to pressures sensed in said bleed conduit, thus to vary the size of said orifice.

3. A system in accordance with claim 2 and including adjustable stop means in the path of said poppet for limiting the movement of said poppet away from said seat, thereby to vary the size of said orifice.

4. Apparatus in accordance with claim 1 wherein said restrictor valve includes a casing, an input port in said casing connected to said bleed conduit and an exit port in said casing connected to said reservoir, a chamber in said casing connected to said input port, a valve seat member slidably mounted in and forming a wall of said chamber, spring means biasing said valve seat toward one end of said chamber, said seat member being shiftable away from said one end responsive to pressures in said chamber of a predetermined magnitude, a poppet movably mounted in said casing, poppet spring means urging said poppet into sealing position of said seat member, and control circuit means for shifting said poppet to an open position a selected distance away from said seat, said poppet and seat, in said open position, defining therebetween a restricted orifice interposed between said input and output ports, the size of said orifice varying inversely with the pressure in said chamber.

5. Apparatus in accordance with claim 4 and including adjustable stop means shiftable toward and away from said seat member, said stop means being disposed in the path of said poppet whereby the spacing of said poppet from said seat in said open position is varied in accordance with the adjusted position of said stop means.

* * * * *